United States Patent Office

2,885,430
Patented May 5, 1959

2,885,430

BIS-(O:O-DIETHYL-DITHIOPHOSPHORYL) 1:4-BUTYLENE-DIMETHYL ETHER

Otto Scherer, Helmut Hahn, and Heinz Frensch, Frankfurt am Main, Ludwig Friedrich Emmel, Bergen-Enkheim, near Frankfurt am Main, and Wilhelm Staudermann, Frankfurt am Main, Germany, assignors to Farbwerke Hoechst Aktiengesellschaft vormals Meister Lucius & Bruning, Frankfurt am Main, Germany, a corporation of Germany No Drawing. Application April 2, 1957
Serial No. 650,079

1 Claim. (Cl. 260—461)

It is known to use neutral phosphoric acid esters and sulphur derivatives thereof for the destruction of pests and spider mites. However, notwithstanding the excellent properties that these compounds possesss in some respects, they have no or only an inadequate action on the eggs of the pests. Such action is desirable, especially in the case of pests that propagate rapidly and continually and of which the generations partly overlap, so that adult animals exist simultaneously with their eggs. It has not been possible hitherto simultaneously to destroy, for example, spider mites (red spiders, tetranychidae) and their eggs.

The present invention provides as pesticides neutral bis-phosphoric acid esters which correspond to the general formula $$\begin{array}{c} R_1-O \\ \phantom{R_1-O} \diagdown \\ \phantom{R_1-O}\phantom{aa}P-X-CH_2-Y-CH_2-X-P \\ \phantom{R_1-O} \diagup \phantom{aaaaaaaaaaaaaaaaaaaaa} \\ R_2-O \phantom{aa} X \phantom{aaaaaaaaaaaaa} X \end{array} \begin{array}{c} O-R_3 \\ \diagup \\ \phantom{aa} \\ \diagdown \\ O-R_4 \end{array}$$

in which $R_1$—$R_4$ each represent an alkyl or alkenyl group containing 1–4 carbon atoms, X represents oxygen or sulphur, and Y represents oxygen, sulphur or —O(CH$_2$)$_n$O— (in which $n$ is a whole number from 1 to 10).

The invention also provides a process for the manufacture of neutral bis-phosphoric acid esters of the above formula, wherein an appropriate dialkyl or dialkenyl phosphoric acid or thio-phosphoric acid or a metal salt or halide of such acid is reacted with an ether or thioether of the formula Z—CH$_2$—Y—CH$_2$—Z, in which the Z's represent halogen atoms or hydroxyl groups, and Y has the meaning given above, for example, symmetrical dichlorodimethyl ether, symmetrical dichlorodimethyl thioether or 1,4-butylene glycol-bis-(chloromethyl ether).

The compounds of this invention possess a combined insecticidal, acaricidal and ovicidal action. They therefore have a wide range of application and can be used against both sucking and biting insects and also against spider mites (Arachnoidea) and their eggs, so that the need for repeated applications is avoided.

In contradistinction to known ovicides, the compounds of this invention have the special advantage that they kill the embryos of all ages. After their penetration into the egg they exhibit an after-effect which, even if the embryo further develops for a short time, finally causes its death.

The field of application of the compounds of this invention is not restricted to plant protection but extends to other kinds of pest control, such as the control of domestic pests, warehouse pests and pests injurious to health.

The active substances of this invention can be applied in the dry or wet state, for example, as spraying, dusting or strewing preparations or solutions, if desired, in combination, for example, with other insecticides, acaricides, ovicides, fungicides or synergists.

The following examples illustrate the invention.

EXAMPLE 1

*Bis-(O:O-dimethyl-dithiophosphoryl)-dimethyl ether*

46 grams of dichlorodimethyl ether are introduced dropwise in the course of 15 minutes, while heating, into 165 grams of potassium dimethyl dithiophosphate suspended in 200 cc. of methylene chloride. After heating the mixture for 2 hours at 45° C., the precipitated salt is separated and the solution is evaporated. 100 grams of bis - (O:O - dimethyldithiophosphoryl)-dimethyl ether are obtained in the form of a yellowish oil. The compound corresponds to the following formula.

$$\begin{array}{c} CH_3-O \\ \diagdown \\ \phantom{aa}P-S-CH_2-O-CH_2-S-P \\ \diagup \\ CH_3-O \phantom{aa} S \end{array} \begin{array}{c} OCH_3 \\ \diagup \\ \diagdown \\ S \phantom{aa} OCH_3 \end{array}$$

*Analysis.*—$C_6H_{16}O_5S_4P_2$ (molecular weight: 358). Calculated: 35.8% S. Found: 35.6% S.

EXAMPLE 2

*Bis-(O:O-diethyl-dithiophosphoryl)-dimethyl ether*

165 grams of potassium diethyl dithiophosphate are suspended in 250 cc. of methylene chloride and 38.5 grams of dichlorodimethyl ether are added dropwise in the course of ½ hour. The temperature of the mixture rises spontaneously to 45° C. After boiling the mixture under reflux for 2 hours it is filtered to remove the residue of salt. By evaporating the solvent there are obtained 136 grams of pale yellow bis-(O:O-diethyl-dithiophosphoryl)-dimethyl ether. The compound has the following analysis and formula.

*Analysis.*—$C_{10}H_{24}O_5S_4P_2$ (molecular weight: 414). Calculated: 28.2% C, 5.80% H, 30.9 S, 15.0% P. Found: 28.6% C, 5.85% H, 30.8% S, 14.7% P.

$$\begin{array}{c} C_2H_5-O \\ \diagdown \\ \phantom{aa}P-S-CH_2-O-CH_2-S-P \\ \diagup \\ C_2H_5-O \phantom{aa} S \end{array} \begin{array}{c} OC_2H_5 \\ \diagup \\ \diagdown \\ S \phantom{aa} OC_2H_5 \end{array}$$

EXAMPLE 3

*Bis-(O:O-dimethyl-dithiophosphoryl)-dimethyl sulphide*

200 grams of potassium dimethyl dithiophosphate are heated for 15 hours at 50–60° C. in 400 cc. of acetone with 66 grams of dichlorodimethyl sulphide. The mixture is then poured into ice water, extracted with methylene chloride and the extract solution is dried over sodium sulphate. By evaporating the methylene chloride 143 grams of bis-(O:O-dimethyl-dithiophosphoryl)-dimethyl sulphide are obtained in the form of a very slightly yellow oil. The compound has the following analysis and formula:

*Analysis.*—$C_6H_{16}O_4S_5P_2$ (molecular weight: 374). Calculated: 42.7% S. Found: 42.5% S.

$$\begin{array}{c} CH_3-O \\ \diagdown \\ \phantom{aa}P-S-CH_2-S-CH_2-S-P \\ \diagup \\ CH_3-O \phantom{aa} S \end{array} \begin{array}{c} OCH_3 \\ \diagup \\ \diagdown \\ S \phantom{aa} OCH_3 \end{array}$$

EXAMPLE 4

*Bis-(O:O-diethyl-dithiophosphoryl)-dimethyl sulphide*

125 grams of potassium diethyl dithiophosphate, 150 cc. of methylene chloride and 33 grams of dichlorodimethyl sulphide are heated at the boil for 4–5 hours. After being cooled, the organic solution is thoroughly agitated with water, then dried over sodium sulphate, and the methylene chloride is evaporated. 100 grams of slightly yellow bis - (O:O - diethyl - dithiophosphoryl)- dimethyl sulphide remain behind. It has the following analysis and formula:

Analysis.—$C_{10}H_{24}O_4S_5P_2$ (molecular weight: 430). Calculated: 37.4% S. Found: 37.1% S.

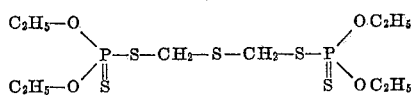

EXAMPLE 5

*Bis-(O:O-diethyl-dithiophosphoryl)-1:4-butylene-dimethyl ether*

120 grams of potassium diethyl dithiophosphate are suspended in 350 cc. of methylene chloride, and 47 grams of 1,4-butylene glycol-bis-(chloromethyl ether) are added dropwise in the course of ½ hour. By heating the mixture under reflux for 2 hours and working up in the usual manner there are obtained 102 grams of bis-(O:O-diethyl-dithiophosphoryl) - 1:4 - butylene-dimethyl ether having the following analysis and formula:

Analysis.—$C_{14}H_{32}O_6S_4P_2$ (molecular weight: 486). Calculated: 26.4% S. Found: 26.2% S.

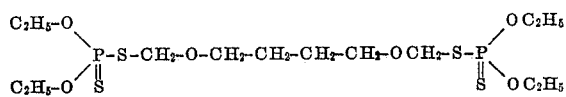

EXAMPLE 6

*Bis-(O:O-diethyl-thiophosphoryl)-dimethyl sulphide*

75 grams of the ammonium salt of O:O-diethyl-thiophosphoric acid are dissolved in 250 cc. of ethanol, and 27 grams of dichlorodimethyl sulphide are added. The mixture is boiled for 2 hours. After cooling the mixture, the precipitated ammonium chloride is filtered off with suction. The ethanol is evaporated from the filtrate and 73 grams of bis-(O:O-diethyl-thiophosphoryl)-dimethyl sulphide remain behind in the form of an undistillable yellowish oil. It has the following analysis and formula.

Analysis.—$C_{10}H_{24}O_6S_3P_2$ (molecular weight: 398). Calculated: 24.6% S, 15.9% P. Found: 23.8% S, 15.4% P.

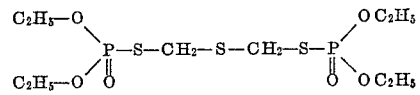

EXAMPLE 7

*Bis-(O:O-diethyl-thiophosphoryl)-dimethyl ether*

75 grams of the ammonium salt of O:O-diethyl-thiophosphoric acid are dissolved in 250 cc. of ethanol and 23 grams of dichlorodimethyl ether are added. The mixture is boiled, and, after being cooled, it is filtered. The ethanol is distilled from the filtrate, and 65 grams of bis-(O:O-diethyl-thiophosphoryl)-dimethyl ether remain behind in the form of a colourless undistillable oil. It has the following analysis and formula:

Analysis.—$C_{10}H_{24}O_7S_2P_2$ (molecular weight: 382). Calculated: 16.8% P, 16.6% S. Found: 16.3% P, 16.7% S.

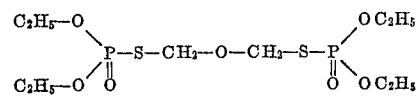

We claim:
Bis-(O:O-diethyl - dithiophosphoryl) - 1:4 - butylene-dimethyl ether.

References Cited in the file of this patent

FOREIGN PATENTS 515,666    Canada _____ Aug. 16, 1955